Feb. 28, 1961 G. F. GRONDIN 2,973,407
BINARY CODE SYNCHRONIZER
Filed May 5, 1958 7 Sheets-Sheet 1

INVENTOR.
GEORGE F. GRONDIN
BY Moody and Goldman
ATTORNEYS

INVENTOR.
GEORGE F. GRONDIN
BY Moody and Goldman
ATTORNEYS 2,973,407

BINARY CODE SYNCHRONIZER

George F. Groundin, Van Nuys, Calif., assignor to Collins Radio Company, Cedar Rapids, Iowa, a corporation of Iowa Filed May 5, 1958, Ser. No. 733,086

19 Claims. (Cl. 178—26)

This invention relates to means for translating nonsynchronous pulse-coded information into synchronous bit form.

Many types of pulse-coded modulation are feasible. One commonly used type is found in the teletypewriter art. This type, for example, can use information code characters having five binary-coded bauds. Also, two additional bauds, called a "start" baud and a "stop" baud, are used to specify the beginning and end of a code character. Thus, a seven baud character has been specified, and it is used in an exemplary fashion throughout this specification. Code characters of other sizes can also be used.

Conventionally, the start and five information bauds have equal time-length; while the stop baud has approximately 1.41 times the length of any of the other bauds. Accordingly, the output of conventional teletypewriter-coding devices is nonsynchronous with respect to baud timing.

The invention can receive nonsynchronous data and changes it into baud synchronous data in preparation for synchronous data transmission. A baud synchronous transmission can consume less bandwith and can enable reception with a higher signal-to-noise ratio than a nonsynchronous transmission of data. Synchronous transmission requires that all bauds have the same length or an integer multiple of a given length.

Other nonsynchronous-to-synchronous code converters are known. For example, a previous converter is described and claims in my prior Patent No. 2,838,858, filed February 28, 1956, titled "Code Converter" and assigned to the Collins Radio Company. In my prior system, parallel-storage means was provided for each information baud, with the storage being for a period of several bauds. A timing source was used to synchronously sample the storage means in a given order. The synchronous timing rate was necessarily faster than the instantaneous input rate; and, accordingly, the system occasionally provided a blank character output while the nonsynchronous input data caught up with the synchronous readout.

In my present system an entirely different principle is used; which enables structural simplification with resulting economies, as well as an improvement in performance. The present invention determines the phase relationship between received nonsynchronous data and interleaved synchronous-timing pulses. A decision function in the invention uses this phase relationship to decide whether or not to directly sample the nonsynchronous data. If certain timing pulses are phased with the introductory portion of the nonsynchronous data, the decision is to sample directly. If other timing pulses are so phased, the decision is not to sample directly, but instead to sample the data from a series-storage device, which simply delays the incoming data by a fraction of a baud period.

The central fifty-percent portion of each received nonsynchronous baud is generally its most reliable portion for sampling purposes, because that portion usually has the maximum amplitude and least rate-of-change for each received baud pulse. The terminal twenty-five percent portions of a baud pulse often taper off at a rapid rate and are not as reliable for sampling purposes. The invention always enables sampling from the optimum portion of each received baud.

It is a further object of this invention to provide a code converter which changes nonsynchronous binary data to synchronous data although the received nonsynchronous rate is either instantaneously faster or slower than the synchronous output rate.

It is another object of this invention to provide a code converter that does not have any mechanically moving parts.

It is still another object of this invention to provide a code converter that is bistable in operation and thus has bistable reliability.

It is a further object of this invention to provide a binary code converter which is more simple in its structure than any prior converter known, and is thus more economical to manufacture.

Further objects, features, and advantages of this invention will become apparent to one skilled in the art upon further study of this specification and drawings, in which:

Figures 5(A), (B), (C), (D), (E), (F), and (G) illustrate timing diagrams;

Figure 1:
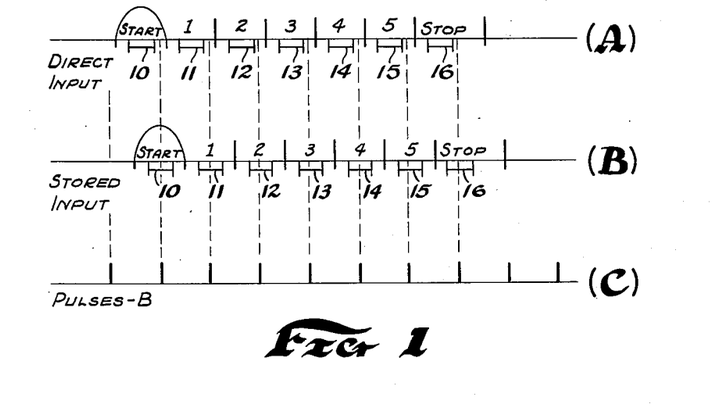
Figures 1 and 2 illustrate basic baud-timing diagrams.
Figure 2:
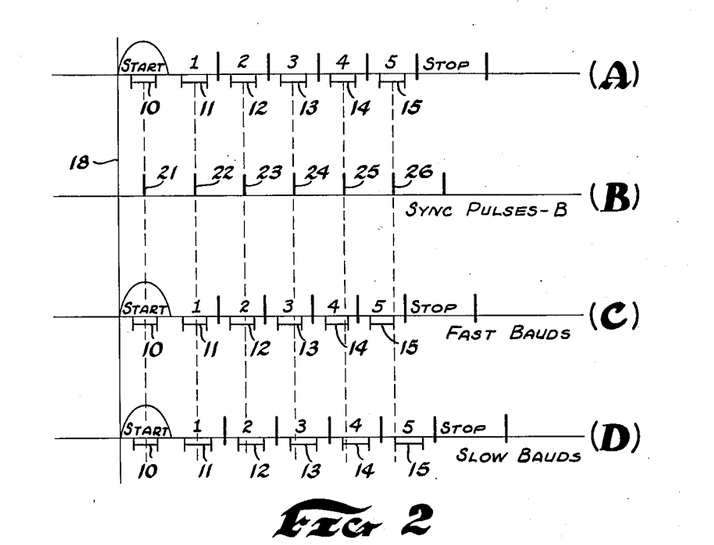

Now referring to the drawings for a more thorough explanation of the invention, Figures 1 and 2 show timing relationships that illustrate basic principles used by the invention. A teletypewriter code-character is illustrated in Figure 1(A), which is defined as being nonsynchronous as to its starting time. That is, the initiation of its "start" pulse is random with respect to any synchronous wave source, such as synchronous pulses-B shown in Figure 1(C). The character is bounded by "start" and "stop" bauds, and between them are five information bauds, designated as 1, 2, 3, 4 and 5, which are off-on pulse-coded in the conventional manner. Hence, information bauds 1–5 are binary in form, and each may be either a mark or a space. A mark herein implies an electrical quantity substantially filling the respective portions of the baud, and a space implies the absence of any (or a different valued) electrical quantity in the baud space. Generally, the terminating stop baud is a space so that immediately upon its termination, a new code character can be initiated.

Figure 1(B) illustrates the same character as in Figure 1(A) but delayed by one-half the period of the "start" baud. For initial simplicity, the length of the start and information bauds in Figures 1(A) and (B) are assumed to be equal to the period of synchronous-timing pulses-B. However, the "stop" pulse has a length of approximately 1.4 times the period of the other bauds in the code character and prevents a sequence of such code characters from being synchronous.

In practice, ideal rectangularly-shaped pulses are seldom found. The usual pulse has a rounded top and sloping rise and fall portions. Consequently, its best portion for reliably determining its polarity is its center portion. The central fifty percent portions are sampled in the illustrated embodiments, with the exception of the "stop" bauds, which are sampled in the eighteen to fifty-three percent portions from their leading edge. This however provides a sampling time range with the same spacing from the leading edge for the "stop" baud as for the other bauds. In Figures 1(A) and 1(B) the sampling ranges are illustrated as 10, 11, 12, 13, 14, 15 and 16.

Sampling in the invention is done by synchronous pulses-B. The duty cycle of synchronous pulses-B is very small; wherein the pulse duration is very short compared to a baud period.

It can be viewed in Figures 1(A) and (B) that the middle fifty percent sampling ranges of the direct and stored inputs are complementary. That is, one set of ranges exists during times when the other does not exist. It then is realized that the timing of pulses-B will occur within either the sampling range of the direct input or of the stored input, regardless of the random phasing of the nonsynchronous input.

A decision operation is used in the invention to determine whether the direct input or stored input has a set of sampling ranges during which pulses-B occur.

For simplicity in Figure 1(A), the baud periods, except for the stop baud, were presumed to have a period equal to that of the synchronous pulses. Hence, it is the incongruous length of the stop baud which prevented synchronism for a sequence of code characters.

Figures 2(C) and (D) illustrate conditions where all bauds have nonsynchronous periods. Figure 2(A), however, is the same as Figure 1(A) and is provided again for comparison purposes. Figure 2(B) illustrates a relative timing for synchronous pulses-B. Figure 2(C) illustrates a nonsynchronous code-character transmitted at a faster rate than the character of Figure 2(A), while the nonsynchronous character in Figure 2(D) is shown at a slower rate. Each of the code characters in Figures 2(A), (C) and (D) is assumed to start at the same time 18, illustrated by a common vertical line 18. The timing of the synchronous pulse in Figure 2(B) is carried to Figures 2(A), (C) and (D) by vertical dashed lines 21—26. With the fast code character of Figure 2(C), the baud sampling ranges advance with respect to the synchronous-timing pulses. On the other hand, with the slow character of Figure 2(D), the sampling ranges retard with respect to the synchronous-timing pulses.

The extremeness of the cases in Figures 2(C) and (D) can now be realized. Accordingly, it is noted in each case when first timing pulse 21 falls centrally in the start baud, sixth pulse 26 falls on opposite boundaries of sampling ranges 15 in Figures 2(C) and (D). Although timing pulses occurring during the stop bauds will be slightly outside stop-baud range 16, given in Figure 1(A), no harm is done since generally the stop baud is the absence of a pulse. The cases in Figures 2(C) and (D) are predicted upon fifty percent central sampling ranges. They permit a rate variation for the nonsynchronous input of about plus or minus five percent from the synchronous timing rate. However, where the nonsynchronous pulses are reasonably well formed, the invention can accept more extreme nonsynchronous rates.

Figure 3:
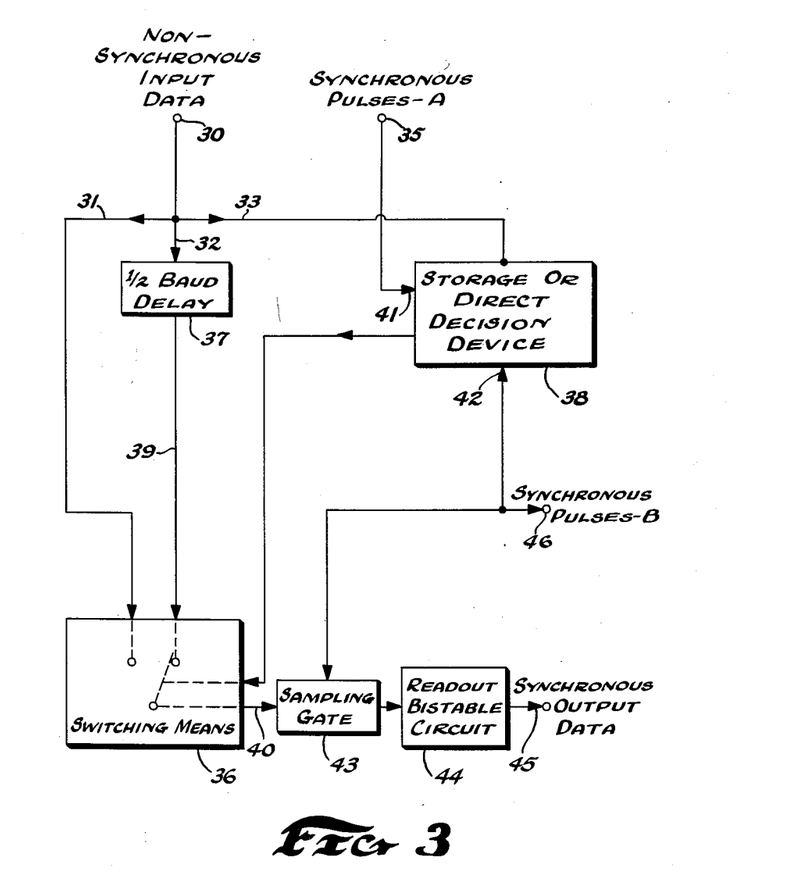
Figure 3 illustrates the basic system used by the invention.

Figure 3 illustrates a basic form of the invention. Nonsynchronous data is received at an input terminal 30, and is provided to three places in the system by leads 31, 32 and 33, which respectively connect to a switching means 36, a storage delay device 37 and a decision device 38. Storage device 37 delays the data by approximately one-half baud period, so that the data on its output lead 39 is about one-half baud period behind the direct data on lead 31. Storage device 37 can be a bistable device or a delay line. The latter is assumed in Figure 1.

In order to assist the decision function of the system, a second set of synchronous pulses is provided at a terminal 35 and is designated as pulses-A. Pulses-A occur one-half of a synchronous period from pulses-B. Their interleaved-time relationship can be seen by viewing Figures 5 (C) and (D). Device 38 receives pulses A and B from terminals 35 and 46. It observes whether a pulse-A or a pulse-B occurs during the fifty percent mid-range period of each start pulse. If a pulse-A is then observed, the delayed data is sampled, because then sampling pulses-B will occur within (or very close to) the fifty percent mid-portions of the half-baud delayed data. On the other hand, if a pulse-B is observed during the start pulse's fifty percent mid-range period, the direct data is sampled, since sampling pulses-B then occur during (or very near to) the fifty percent mid-portions of the direct data.

Switching means 36 receives inputs from the direct data of lead 31 and the stored data of lead 39. Switching means 36 operates like a double-throw switch. Although its output 40 can normally be connected to either input, it preferably is normally connected to the stored input as shown in Figure 1. Hence, switching to the direct input only occurs when decision device 38 sees a pulse-A during the first one-quarter period of a start baud.

The reason why a decision is made during the start baud rather than during some other baud is that a code-character timing change is first sensed with its start baud; and a decision made then holds for the remaining bauds of its character.

A read-out sampling gate 43 receives the selected output of switching means 36 and samples portions of that output only during the short durations of synchronous pulses-B, which are provided as an input to sampling gate circuit 43 from a terminal 46. Thus, gate 43 is opened for short synchronous periods that occur during the fifty percent midranges of data received by it. Accordingly, gate 43 provides synchronous output pulses which have a polarity dependent upon the sampled data pulses. A readout bistable circuit 44 is triggered by and to a corresponding polarity as the synchronous sample pulses from gate 43 to provide synchronous output data at terminal 45.

Figure 4:
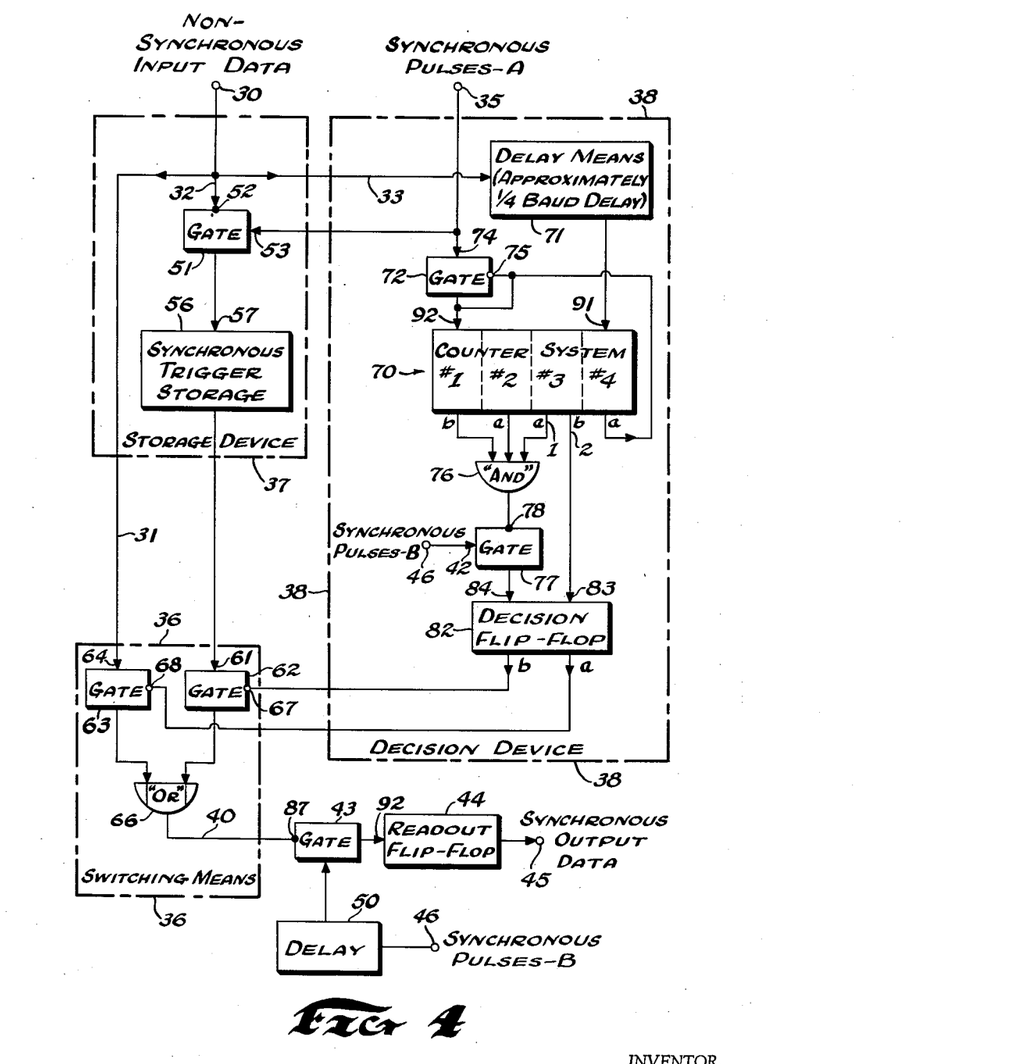
Figure 4 shows a more detailed form of the invention.

Another form of the invention is illustrated in Figure 4 which generally operates in the same manner as the embodiment of Figure 3. It also accepts nonsynchronous data at terminal 30 and provides synchronous output data at terminal 45. The component blocks defined in Figure 3 are illustrated by broken lines in Figure 4 but are given the same reference numbers. Storage device 37 includes a gate 51 and a flip-flop or trigger circuit 56. Gate 51 has an enabling input 52 connected to data input lead 32, and has another input 53 connected to terminal 35 to receive synchronous-timing pulses-A. Thus, gate 51 synchronously samples the direct data at the instances of pulses-A. Circuit 56 is connected to the output of gate 51, and is triggered to a voltage state corresponding to the polarity state of the data synchronously sampled by gate 51. That is, flip-flop 56 is synchonously actuated by the output of gate 51 to the same state as the received data.

Since there is assumed to be a random phase relationship between the input data and the synchronous-timing pulses, the sampling of the data by gate 51 can be from any portion of the bauds of the nonsynchronous data, and not necessarily from their fifty percent midranges. It will be seen later in this specification that the output of trigger circuit 56 is used only when the fifty percent midranges (or very nearly so) of the data bauds are sampled by gate 51 because of the operation of decision device 38.

Switching means 36 includes a pair of gates 62 and 63 with outputs connected to an "or" circuit 66, that provides output 40 of the switching means.

An enabling input 61 of gate 62 receives the output of storage device 37; and an enabling input 64 of gate 63 receives the direct data input from lead 31. The other respective inputs of gates 62 and 63 are received from decision device 38 (discussed below) to operate switching means 36 in a double-throw manner. "Or" circuit 66 merely provides isolation between the outputs of gates 62 and 63.

Decision device 38 receives the nonsynchronous input data from lead 33 at a delay means 71, which provides an approximate one-quarter baud delay. Thus, when the leading edge of a "start" pulse is received at nonsynchronous input terminal 30, delay means 71 provides an output pulse one-quarter baud later, hereafter called a delayed-start pulse.

The delayed-start pulse is received at an input 91 of a binary-counter system 70. Counter system 70 is started by the delayed-start pulse to synchronously count the number of bauds in the received character, which here is seven. Counter system 70 disables decision device 38 from terminal 30 during the remaining part of the character, so that a decision is made only once per character, which is at its beginning. Hence, noise and other bauds during the remaining part of the character do not interfere with the decision operation.

Counter system 70 comprises four tandem-connected binary counters, which can be flip-flop circuits. Each of the four counters is capable of simultaneously providing two opposite output states, well known for a flip-flop circuit; wherein either output can have one of two voltage levels $a$ or $b$. However, with counters #1, #2 and #4, only one output is used; while with counter #3 both outputs 1 and 2 are used. The counters are connected in a pulse-divider arrangement, wherein the counting input of counter system 70 is input 92 of counter #1.

Synchronous pulses-A from terminal 35 are provided to counter input 92 through a gate 72, that has an enabling input 75 connected to the output of counter #4. Accordingly, gate 72 is enabled to pass pulses-A when counter #4 provides an output level "$b$."

Furthermore, when counter #4 input 91 receives a delayed-start pulse, it triggers the counter #4 output to level "$b$," which creates a leading edge that directly triggers counter #1 input 92, as gate 72 is being simultaneously enabled to pass the next seven pulses-A.

Upon receipt of the seventh pulse-A, the output of counter #4 is triggered back to level "$a$" which disables gate 72 and stops further pulses-A from reaching the counter. At that time, the code-character has ended, and counter #4 is again triggerable by the next delayed-start pulse.

A greater understanding of the pulsing sequence of counter system 70 may be obtained from the following table. Each vertical column of the table gives the output levels of the respective counters immediately after the counter system receives the pulse named at the top of the column.

Table

|  | Normal Setting, 7th Pulse A | Delayed-Start Pulse | Synchronous Pulses-A | | | | | | Normal Setting |
|---|---|---|---|---|---|---|---|---|---|
|  |  |  | 1 | 2 | 3 | 4 | 5 | 6 | 7 |
| Counter #1 | b | a | b | a | b | a | b | a | b |
| Counter #2 | a | a | b | b | a | a | b | b | a |
| Counter #3 {1 | a | a | a | a | b | b | b | b | a |
| Counter #3 {2 | b | b | b | b | a | a | a | a | b |
| Counter #4 | a | b | b | b | b | b | b | b | a |

An "and" circuit 76 has three inputs respectively connected to the outputs of counters #1, #2 and the first output of #3. "And" circuit 76 provides an output "$b$" only when all inputs are at level "$a$." Initially, circuit 76 is disabled by the "$b$" level input received from counter #1.

A gate 77 receives the output of "and" circuit 76 at its input 78. Also, synchronous pulses-B are applied to another input 42 of gate 77. Thus, gate 77 can pass a pulse-B only when all inputs of "and" circuit 76 are at level "$a$," which is seen from the above table to occur only when a delayed-start pulse is received by counter system 70.

A decision flip-flop circuit 82 is set according to whether a pulse A or B occurs first after a delayed-start pulse. An input 84 of flip-flop 82 is connected to the output of gate 77 and another input 83 is connected to the second output of counter #3. Flip-flop circuit 82 provides the output levels shown in Figure 4 immediately before a delayed-start pulse, because of the output states of the counters then existing. A pulse of "$b$" level at input 83 assures these preset output levels.

Consequently, as soon as a code-character start pulse is received at terminal 30 it is received by delay means 71, which provides a delayed-start pulse one-quarter baud later to trigger counter #4. Then, counter #4 provides output level "$b$," which simultaneously enables gate 72 and triggers counter #1 to provide output level "$a$." Accordingly, "and" circuit 76 receives levels "$a$" at all inputs to enable gate 77. However, gate 77 is enabled only until the first pulse-A occurs after the delayed-start pulse, and it is only while enabled that a pulse-B can pass through gate 77 to trigger flip-flop 82. Hence, if a pulse-A occurs before a pulse-B, gate 77 is closed before a pulse-B can trigger decision flip-flop 82; and it continues to provide its normal outputs shown in Figure 4, which enable gate 62 and disable gate 63 of switching means 36. The stored data from device 37 is then selected by switching means 36.

On the other hand, if a pulse-B occurs before any pulse-A after gate 77 is enabled, the pulse-B triggers decision flip-flop 82 to reverse its output states from those illustrated. Consequently, gate 62 is disabled and gate 63 is enabled, so that the direct non-synchronous input is selected by switching means 36. The first pulse-A follows shortly thereafter to trigger counter #1 and disable gate 77, so that later pulses-B cannot trigger flip-flop 82, until gate 77 is again enabled at the beginning of the next code-character.

It can be observed from the above table that counter #4 provides level "$b$" output until the seventh pulse-A, when the system reverts to the initial "normal" state in preparation for receiving the next code character. However, if decision flip-flop 82 is not then at the normal illustrated output levels, the transition of counter #3 after the seventh pulse-A causes flip-flop 82 to be triggered to the illustrated output levels.

Read-out gate 43 has an input 87 connected to output 40 of switching means 36. The synchronous pulses-B are provided at the other input of gate 43 through a delay means 50 that delays pulses-B sufficiently to prevent any coincidence between a sampling pulse-B and the operation of gates 62 and 63. Thus, input 87 receives either the stored or the direct data as determined by storage device 37. Thus, gate 43 provides output pulses synchronous with pulses-B and having voltage levels corresponding to that of the data.

A read-out flip-flop 44 has its input 92 connected to the output of gate 43. The output level of readout flip-flop 44 is triggered to a level corresponding to that of the received pulses and is provided to output terminal 45 as a synchronous rendition of the nonsynchronous data received at input terminal 30.

Figure 5:
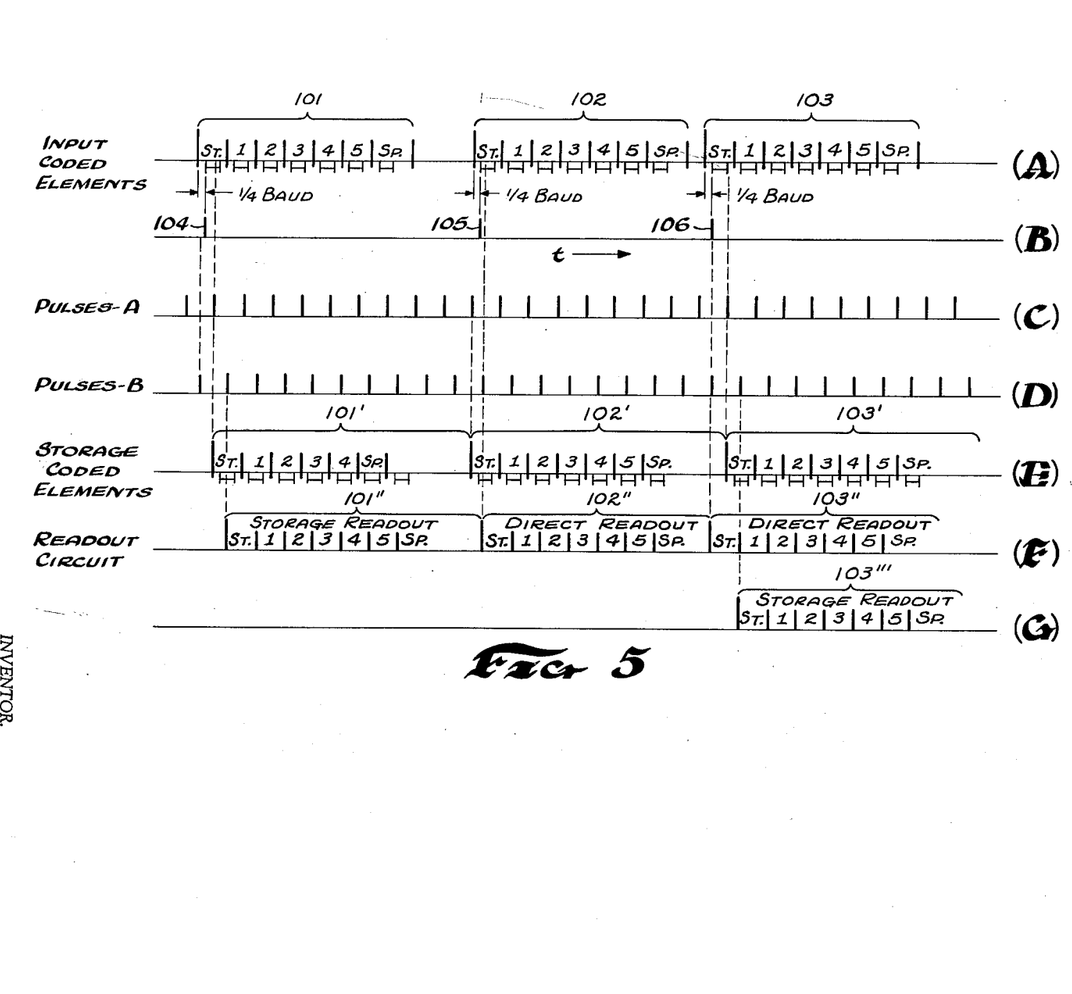

Figure 5 illustrates timing sequences to aid an understanding of the invention. Figure 5(A) shows a sequence of three nonsynchronous code-characters 101, 102 and 103. Figure 5(B) illustrates the corresponding delayed-start pulses 104, 105 and 106 provided by delay means 71, which are about one-quarter baud behind the beginning of the corresponding start (ST.) pulses of Figure 5(A).

Figures 5(C) and (D) illustrate interleaved synchronous pulses A and B respectively. Figure 5(E) shows the stored (delayed) information from trigger circuit 56. Note that the leading edge of each of stored bauds of Figure 5(E) aligns time-wise with pulses-A. This is obvious from the structure of device 37 which is enabled by the data but is triggered by pulses-A. Figure 5(F) illustrates the synchronous output at terminal 45. Figure 5(G) illustrates an alternate read-out that is permissible in regard to code character 103 of Figure 5(A). Note that the read-out bauds all have their leading and trailing edges aligned with pulses-B (neglecting any delay by circuit 50). This is apparent from the structure of read-out sampling circuit 43, wherein the output of the system is always triggered by pulses-B in gate 43.

Now considering nonsynchronous code character 101 in Figure 5(A) as being received at terminal 30, delayed-start pulse 104 is provided from circuit 71 one-quarter baud after the leading edge of its start pulse. Pulse 104 triggers counter #4 to enable gate 72 permitting pulses-A to pass, and to simultaneously enable "and" circuit 76 permitting pulses-B to pass. Thus, gates 72 and 77 are simultaneously enabled one-quarter baud after the initiation of a code character. It can be seen from Figures 5(C) and (D) that a pulse-A occurs first after delayed-start pulse 104. This pulse-A passes through gate 72, triggers counter #1 to provide it with a "b" level output which disables "and" circuit 76 and therefore gate 77. Consequently, decision flip-flop 82 remains in its initial output states (illustrated), which cause switching means 36 to select stored data for sampling by the read-out gate and flip-flop.

It is noted from the illustrated time relationship between Figures 5(A) and (C) that the pulses-A occur during the fifty percent midportions of the bauds of character 101. Hence, storage gate 51 is sampling and is triggering flip-flop 56 with the prime portions of the nonsynchronous incoming data. As a result, stored character 101' in Figure 5(E) is determined to be optimum before being applied to read-out sampling gate 43. It will be noted from the time relationship between Figures 5(D) and (E) that pulses-B sample the mid-part of each of the bauds of stored character 101' to provide readout character 101''.

At the end of code character 101, a stop (SP.) pulse is received and is stored in flip-flop 56 by the seventh pulse-A occurring after delayed-start pulse 104. Seventh pulse-A causes counter system 70 to reset to its normal state which disables gate 72 to prevent further actuation of the counter system until after the next nonsynchronous code character 102 in Figure 5(A) is received. After the stop pulse begins, a teletypewriter machine continues to provide the same level as the stop pulse until the next code character has begun, which in effect extends the stop pulse.

As the next code character 102 begins, delayed-start pulse 105 in Figure 5(B) results one-quarter baud later. As explained above, pulse 105 causes gates 72 and 77 to be enabled. However, it is observed from the timing of Figures 5(A), (C) and (D) that a pulse-B is passed by gate 77 before it is disabled by a pulse-A. Hence, flip-flop 82 is triggered to opposite output states, whereby switching means 36 passes the direct nonsynchronous data from terminal 30 to sampling gate 43. Accordingly, read-out gate 43 directly samples the fifty percent midportions of the direct data, as can be seen by comparing the timing of Figures 5(A) and (D). The resultant output from flip-flop 44 is code-character 102'' shown in Figure 5(F). At the end of the seventh pulse-A from the start of character 102, counter #3 triggers flip-flop 82 back to its normal state, which enables switching means 36 to pass the stored data, if any exists.

It is noted during the direct read-out of character 102 that the stored information is not optimum in quality due to the timing of pulses-A with respect to the input data. Accordingly, the stored data is not used by the system when it may be erroneous.

After termination of code character 102 and a nonsynchronous pause, the following nonsynchronous code character 103 starts and provides delayed-start pulse 106 at one-quarter baud period later. The same sequence of events occurs as explained except that, as can be seen from Figures 5(C) and (D), a pulse-B occurs simultaneously with delayed-start pulse 106. Due to such coincidence, it cannot be certain whether or not the pulse-B can pass through gate 77 as it is being enabled. If a sufficient portion of this pulse-B is passed to trigger flip-flop 82, the direct nonsynchronous input is sampled to provide read-out character 103'', illustrated in Figure 5(F), at terminal 46. On the other hand, if this pulse-B is not sufficiently passed through gate 77, the first pulse-A closes gate 77 so that flip-flop 82 is not triggered; and stored information is sampled instead to provide output character 103''', illustrated in Figure 5(G), at terminal 45. The point being made here is that it basically makes no difference in the invention whether or not a synchronous pulse A or B coincides with a start pulse, since the same quality of sampling is accomplished in either case, which is at the boundaries of the fifty percent midportions.

Figure 8:
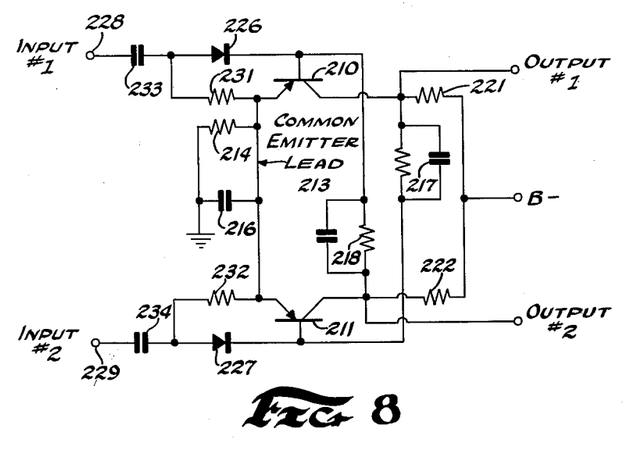

Trigger circuits of almost any type can be used in the invention as circuits 44, 56 and 82, such as various known types using vacuum tubes, transistors, relays, or ferroresonant circuits. Transistor trigger circuits have been found particularly desirable in models of the invention because of their small size and the power consumption, combined with a high degree of reliability. Figure 8 illustrates a known transistor trigger circuit that is particularly adaptable in the invention. It performs a memory function and is sometimes called a "toggle" circuit. It includes two transistors 210 and 211 having their emitters connected by a common lead 213, which is connected to ground through a resistor 214 and a capacitor 216. A first parallel RC circuit 217 connects the collector of transistor 210 to the base of transistor 211; and a second parallel RC circuit 218 connects the collector of transistor 211 to the base of transistor 210. Resistors 221 and 222 respectively connect the collectors of the transistors to a B— power source. First and second trigger-circuit outputs are obtained respectively from the collectors of the transistors. A pair of input terminals 228 and 229 receive data to be retained by the circuit. A pair of differentiating capacitors 233 and 234 are serially connected to terminals 228 and 229. Also, a pair of diodes 226 and 227 have their cathodes respectively connected to the base of transistors 210 and 211 and have their anodes connected respectively to first and second capacitors 233 and 234. Further, a pair of resistors 231 and 232 are respectively connected between the anodes of the diodes and common-emitter lead 213 to establish the bias on the diodes. The common-emitter lead 213 maintains at a substantially constant voltage due to the alternate operation of the transistors and therefore can be used as a voltage reference.

The trigger circuit of Figure 8 can be triggered only by positive input pulses because PNP transistors are shown. NPN transistors could be used instead, with reversal of diode polarity, for triggering only by negative input pulses. Once triggered to a given state by a positive pulse at one of the inputs, that input is no longer effective for triggering. A positive pulse at the opposite input is then needed to trigger the circuit to its opposite state, and so forth.

Figure 9:
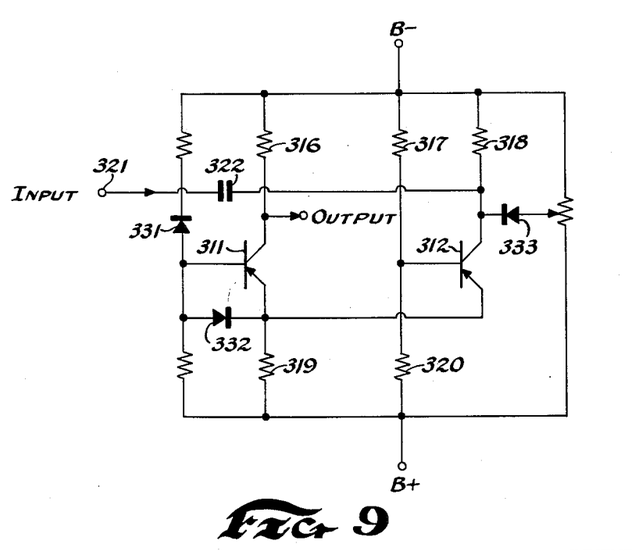

The circuit of Figure 9 is a form of one-shot multivibrator which is referred to later in a discussion of Figure 6. Basically, it is a transistorized version of a well-known multivibrator. It includes transistors 311 and 312, which are biased between B— and B+ power sources by resistors 316 through 320. Input triggering pulses of positive polarity are provided from terminal 321 through a capacitor 322 to the collector of transistor 312. The duration of output pulses provided by the multivibrator is controlled by the time-constant of capacitor 322 and resistor 318. This output pulse-length is adjusted to one-quarter baud period at the synchronous rate of pulses-B. Diodes 331, 332 and 333 assist the pulsing operation within the multivibrator.

Figure 6:
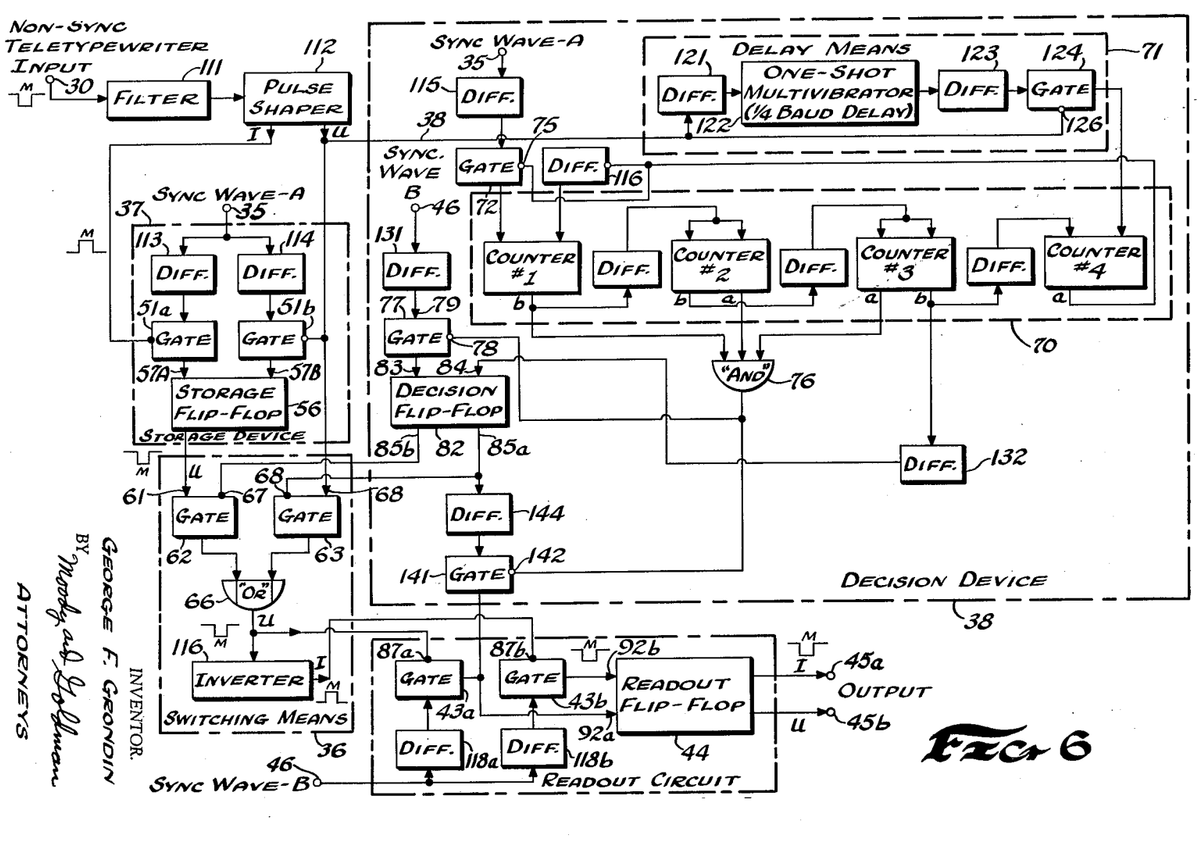
Figure 6 illustrates another detailed form of the invention.

Figure 6 illustrates another form of the invention which uses trigger circuits of the type shown in Figure 8, which can be triggered only by input pulses having a given polarity. Nevertheless, Figure 6 operates in basically the same manner as Figure 4.

In Figure 6, nonsynchronous data is similarly received at terminal 30 and is first passed through a low-pass filter 111 to attenuate high-frequency noise pulses. It is then passed through a pulse-shaper and inverter 112 which squares the received pulses and provides opposite-polarity outputs, designated as I (inverted) and U (uninverted). Such filters and pulse-shapers are well known in the art and will not be explained in detail herein.

Accordingly, an input baud "mark" will have a positive polarity in only one channel, such as provided by uninverted output (U), and an input baud "space" will have a positive polarity only in the inverted channel provided by output (I). In general, the trigger circuits of Figure 6 are presumed to be responsive only to positive polarity input pulses.

Figure 7:
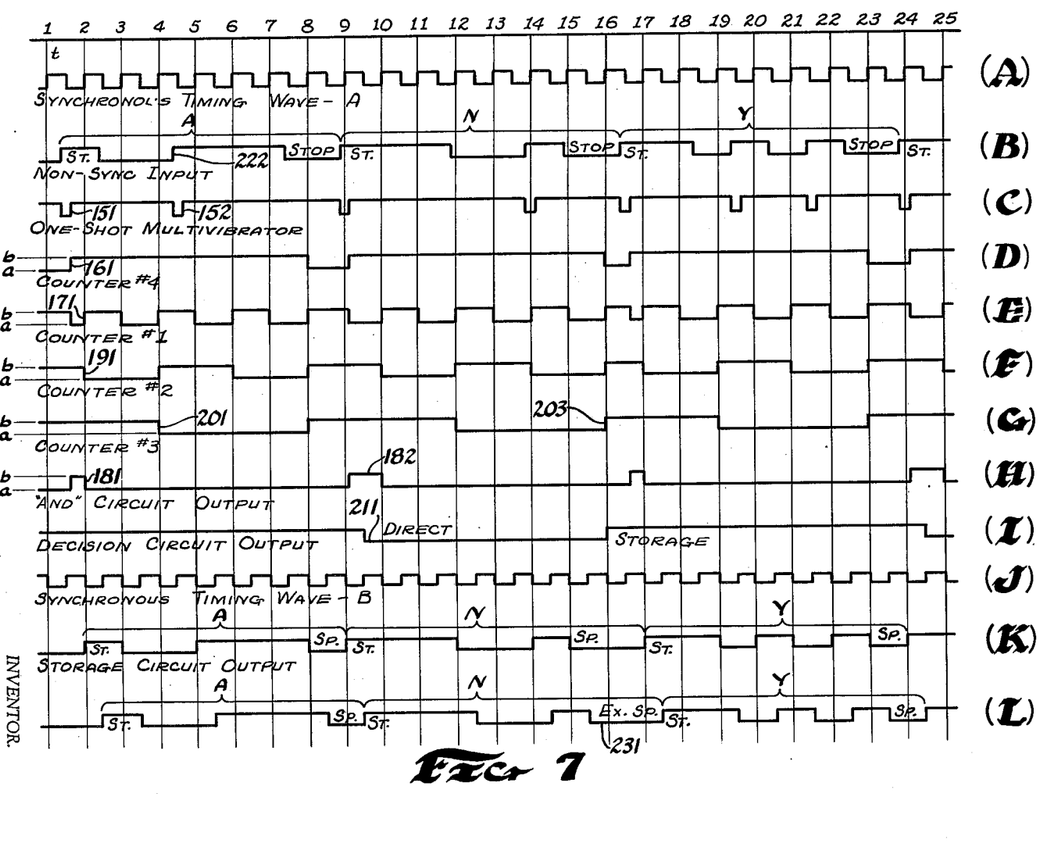
Figure 7 gives waveforms used in explaining the operation of the invention in Figure 6; and, Figures 8 and 9 represent trigger circuit arrangements which, among others, can be utilized in the invention.

The synchronous-timing waves A and B used in Figure 6 do not have precisely the same form as previously given for pulses A and B. Figure 7(A) illustrates synchronous timing wave-A; and Figure 7(J) illustrates synchronous timing wave-B. These waves have a fifty-percent duty cycle, with wave B being polarity inverted with respect to wave A. The positive transitions of each of waves A and B correspond in time to pulses A and B, respectively, given in Figures 5(C) and 5(D). When either of these waves is provided through a differentiating circuit, comprising a capacitor and resistor having a short-time constant, positive pulses A and B are respectively provided. As a practical matter, capacitors are generally needed at the inputs to various parts of the system in order to maintain proper bias levels. It is generally simple to have such capacitors and associated resistances act as differentiating circuits to derive the required pulses A and B. Thus, in storage device 37 in Figure 6 differentiating circuits 113 and 114 are provided and are connected to wave-A at terminal 35. Their outputs provided pulses-A to inputs of respective gates 51a and 51b.

The inverted output (I) and an uninverted output (U) of pulse-shaper 112 are also respectively received by gates 51a and 51b. The two inputs 57a and 57b of storage flip-flop 56 are connected respectively to the outputs of gates 51a and 51b; which are respectively enabled only when they receive positive polarity inputs. Consequently, only the gate which is receiving a positive data baud is enabled. For example, gate 51a is enabled only by baud "spaces," and gate 51b is enabled only by baud "marks." As a result, flip-flop 56 is triggered by its two inputs to an output state that corresponds to the received data.

Switching means 36 is the same as given in Figure 4 in regard to gates 62 and 63, and "or" circuit 66. Means 36 only handles uninverted (U) data, since gate 62 receives the uninverted output of flip-flop 56 and gate 63 receives the uninverted output of shaper 112. However, to assist the operation of later flip-flop circuits, switching means 36 in Figure 6 includes an inverter 116 connected to "or" circuit 66. Thus, switch 36 provides outputs U and I.

Read-out sampling gates 43a and b respectively received the inverted signals U and I from switching means 36. Gates 43a and b are sequentially enabled by the signal that has positive polarity during a given baud period. They also receive pulses-B at their other inputs from differentiating circuits 118a and b connected to synchronous wave-B. Hence, gate 43a provides a pulsed output only for data "marks," and gate 43b only for data "spaces." The inputs 92a and b of read-out flip-flop circuit 44 are respectively connected to the outputs of gates 43a and 43b. Flip-flop 44 is triggered accordingly to provide the synchronous data, as explained above.

Hence, either of the two output terminals 45a and 45b in Figure 6, which are connected to the respective outputs of flip-flop circuit 44, provides the synchronous output data, one output being polarity inverted with respect to the other.

The input to decision device 38 in Figure 6 is connected to the output U of pulse-shaper 112. In Figure 6, delay means 71 is also a coincidence circuit, which not only causes a quarter-baud delay, but also discriminates against unwanted noise pulses. Delay means 71 comprises a differentiation circuit 121 that receives the nonsynchronous data. A one-shot multivibrator 112, which can be that shown in Figure 9, is connected to the output of differentiating circuit 121. Whenever triggered, one-shot multivibrator 122 is actuated for a period equal to one-quarter of a baud period. Another differentiating circuit 123 receives the output of multivibrator 122. A gate 124 has an input connected to differentiation circuit 123, but has another input 126 connected to the output U of pulse-shaper 112 to receive directly the nonsynchronous data. Hence, whenever a code-character begins, the leading edge of its "start" pulse acts through differentiating circuit 121 to trigger multivibrator 122. After one-quarter baud period, multivibrator 122 reverts to its original state, and in the transition causes a pulse through differentiating circuit 123 to gate 124, which is being enabled by the "start" pulse. Thus, the pulse passes through gate 124 and triggers counter #4 of counter system 70. Therefore, a coincidence between the start pulse and the delayed output of multivibrator 122 must exist to provide an output from delay means 71. Noise pulses may trigger multivibrator 122; but if no start pulse exists, gate 124 will be closed to prevent any output from means 71.

The operation of counter system 70, gate 72, "and" circuit 76, gate 77, and decision flip-flop 82 is the same as explained in connection with Figure 4. The counters #1–#4 in system 70 can each be made similarly to the circuit illustrated in Figure 8, except in Figure 8 more detail is shown in regard to input-output connections of the component counters, with differentiation circuits provided between them to assist triggering. Synchronous pulses-A are provided to gate 72 from a differentiating circuit 115 that receives synchronous wave-A from terminal 35. Also, a differentiating circuit 116 is connected between the output of counter #4 and an input to counter #1 to improve triggering action.

Another differentiating circuit 131 is interposed between wave-B terminal 46 and gate 77 to provide pulses-B to gate 77. Further, a differentiating circuit 132 is connected between input 84 of flip-flop 82 and the output of counter #3 to improve triggering action.

An additional feature that eliminates a potential ambiguity in the system is provided in Figure 6, and replaces the operation of delay line 50 in Figure 4. In Figure 6, this feature is provided by a differentiation circuit 144 connected to a gate 141. Circuit 144 has its input connected to output 85a of decision flip-flop 82. Gate 141 has an enabling input 142 connected to the output of "and" circuit 76, and the output of gate 141 is connected to input 92a of read-out flip-flop 44. The resolved ambiguity occurs when direct-data sampling is done by the system. In such case, a sampling-pulse-B arrives at read-out gates 43a and b at about the same time as the direct data is switched to the output of switching means 36. This situation is caused by decision flip-flop 82 being triggered by a pulse-B at the same time as read-out gate 43 receives a pulse-B. Consequently, gate 63 opens to pass the direct input data to sampling gates 43a and b in the read-out circuit at the same time that a sampling pulse-B is received by gates 43a and b. Hence, it is unlikely that gate 63 can be opened fast enough to permit the direct data to be sampled by the pulse-B applied to gates 43a and b. Accordingly, the "start" pulse data of a character may be missed; although, of course, gates 63 will be enabled during the remaining bauds of the character to permit them to be read-out accurately.

In Figure 6, whenever a pulse-B actuates flip-flop 82, the switched output at terminal 85a causes a pulse through differentiating circuit 144 and gate 141, which is enabled at this time by the output from "and" circuit 76, to trigger a "mark" output from read-out circuit 44, which provides the required "start" baud. The start baud, by definition, always is identified by the same electrical quantity (which is herein the same as a "mark").

The operation of Figure 6 is further explained using Figures 7(A–L). A numbered time-base t is illustrated across the top of the sheet and is common to all of its figures. Figure 7(A) illustrates timing wave-A. Figure 7(B) provides a nonsynchronous sequence of teletypewriter data which represents the word "ANY." The seven bauds of each character are bracketed to identify the letter they respectively represent. Adjacent bauds of the same polarity are run together in the conventional manner.

Consider first the start pulse (ST.) of the character representing the letter "A." At the initiation of its start pulse, one-shot multivibrator 122 is triggered to provide a pulse 151 in Figure 7(C) having a duration equal to one-quarter baud period. The trailing edge of multivibrator pulse 151 is positive-going and provides a positive pulse at the output of differentiating circuit 123 which passes through gate 124, since it is being enabled at input 126 by the existing start pulse. The pulse from gate 124 triggers counter #4 to provide output level "b" as illustrated by pulse 161 to Figure 7(D). The leading edge of pulse 161 from counter #4 causes a pulse from differentiating circuit 116 that triggers counter #1 to provide output pulse 171 given in Figure 7(E), which is at level "a." Simultaneously, gate 72 receives level "b" pulse 161 from counter #4 and is enabled for the reception of pulses-A.

During the period of counter #1 pulse 171, "and" circuit 76 is enabled to provide output pulse 181, illustrated in Figure 7(H). Pulse 181 from "and" circuit 74 enables gate 77 for the reception of a pulse-B. However, from Figures 7(A) and (J), it is noted that a positive transition of timing wave-A thereafter occurs before a positive transition of timing wave-B. Accordingly, a pulse-A is first provided and passes through gate 72 to trigger counter #1 back to level "b," which terminates pulse 171 illustrated in Figure 7(E) and pulse 181 in Figure 7(H). However, counter #4 continues the "b" level output, thus continuing to enable gate 72 for the reception of pulses-A. Figures 7(E), (F) and (G) illustrate by means of pulses 171, 191 and 201 the actuations of counters #1, #2 and #3 during the reception of the first seven pulses-A. The seventh pulse-A after the beginning of character "A" reverts counter #4 to "a" level, preparing it for the next data character.

Figure 7(I) represents the output of decision device 38 which controls switching means 36. The first occurrence of a pulse-A for first character "A" caused device 38 to decide that switching means 36 should continue to pass stored data. The stored data is illustrated in Figure 7(K). Hence, the positive transitions (pulses-B) of wave-B in Figure 7(J) sample the stored data of character "A" in Figure 7(K) to actuate read-out circuit 44, which accordingly provides synchronous output character "A," shown in Figure 7(L).

During the information bauds of nonsynchronous character "A" in Figure 7(B), the positive-going baud transition 222 caused a pulse 152 from one-shot multivibrator 122 while gate 124 was enabled to provide an output from delay means 71. However, this output cannot actuate counter #4, since it is at level "b" during the five information bauds.

The next character provides the letter "N." Its start baud similarly actuates the system in the same manner as explained for the letter "A" to enable gates 72 and 77. However, due to the different phasing of character "N," a positive transition of the timing wave-B occurs first and triggers decision flip-flop 82. Accordingly, switching means 36 reverses, as shown by pulse 211 in Figure 7(I) to pass the direct nonsynchronous data to read-out sampling gates 43a and b. Also, the transition of flip-flop 82 causes a pulse from differentiating circuit 144 that passes through gate 141, which is enabled at this time by "and" circuit output pulse 182 in Figure 7(H), to trigger input 92a of the read-out flip-flop 44 and provide a synchronous output start pulse.

Thereafter, the system output provides synchronous character "N" in the same manner as previously described for character "A," except that the direct input of Figure 7(B) is sampled by the positive-transitions of wave-B in Figure 7(J). Further, it is noted that the seventh positive-transition of wave-A (seventh pulse-A) after the beginning of character "N" results in a triggering of counter #3 at 203, wherein its first output causes a pulse from differentiating circuit 132 to input 84 of decision flip-flop 82 to reverse its output state, and thus permit stored data to again pass through switching means 36.

Similarly, the character "Y" actuates the system in the same manner as explained for character "A," except that its information bauds are different. However, this is automatically treated by the system.

It is noted in Figure 7 that the character periods of the nonsynchronous data average to be longer than the character periods of the synchronous output. Hence, when the nonsynchronous data is continuous, there generally will be excess time in the synchronous output. This excess time is accounted for by occasionally doubling the period of a synchronous stop pulse such as stop pulse 231 in Figure 7(L), which does not interfere with the synchronism of the output.

Although this invention has been described with respect to particular embodiments thereof, it is not to be so limited as changes and modifications can be made therein which are within the full intended scope of the invention as defined by the appended claims.

I claim:

1. Means for converting nonsynchronous binary data to synchronous data, comprising a bistable-storage device enabled by said nonsynchronous data, a source of synchronous A-pulses connected to said storage device to sample said input data at the synchronous rate of said A-pulses, a decision device connected to receive the nonsynchronous input and being also connected to said A-pulse source, a synchronous source of B-pulses phased 90 degrees with said A-pulses and connected to said decision device, said decision device measuring the phasing of the A-pulses and B-pulses relative to the mid-portions of the received binary data, switching means having inputs connected to the nonsynchronous input and to the synchronous output of the storage device, said switching means selecting one of its inputs at one time for its output, said decision device connected to said switching means to control its output selection, said switching means selecting its storage-device input when said decision device measures the phase of said A-pulse occurrence during the general mid-portions of said nonsynchronous binary data, and said switching means selecting its nonsynchronous input when said decision device measures the phase of said B-pulse occurrence during the general mid-portions of said nonsynchronous binary data, a read-out sampling gate being connected to the output of said switching means and to synchronously sample the selected data.

2. Means for converting nonsynchronous teletypewriter baud-characters received at at input terminal to a synchronous output, comprising storage means connected to said terminal for delaying said input by about one-half a baud, a source of synchronous A-pulses, and a source of synchronous B-pulses occurring midway between said A-pulses, switching means having one input connected to the output of said storage means and having another input connected to said input terminal, said switching means connecting either one or the other of its inputs to its output, a decision-control device having a data input connected to said input terminal, a plurality of gate means in said decision device connected to said A and B pulse sources, said gate means being enabled by the start of each of said characters, one of said gate means being disabled by the first A-pulse received after being enabled, a bistable device being connected to the output of said one gate means, said one gate means passing any B-pulse occurring while enabled to trigger said bistable device, the output of said bistable device being connected to said switching means to control its switching state, with said switching means normally connecting the output of said storage means to its output, said normal connection being reversed when said bistable device is triggered by a B-pulse, baud-counting means being included in said decision device to trigger said bistable circuit to its normal state at the end of each character, a read-out bistable gate having an enabling input connected to the output of said switching means, and said source of B-pulses connected to said read-out gate to synchronously sample the data received from said switching means.

3. Means for converting nonsynchronous input baud-characters to a synchronous output comprising, a source of synchronous A-pulses, and a source of B-pulses, with said B-pulses occurring midway between said A-pulses, a synchronously-enabled bistable-storage device having an input receiving said nonsynchronous baud-characters, the output of said bistable-storage device being timed with said A-pulses, double-throw switching means having one input connected to the output of said bistable-storage device and having another input receiving said nonsynchronous baud-characters, a decision device including one-quarter-baud delay means receiving said nonsynchronous baud-characters, first and second "and" gates in said decision device respectively connected to said sources of A-pulses and B-pulses, a counter system in said decision device being connected to said delay means and being started by the beginning of a delayed character to enable said first and second gates, said second gate being disabled by the first A-pulse received after being enabled, a decision flip-flop being connected to the output of said second gate and being triggered by a B-pulse passing through said gate, a control input of said switching means being connected to said decision flip-flop with the switched position of said switching means corresponding to the output state of said decision flip-flop, said counter system being connected to said decision flip-flop to trigger it to a normal state at the end of each input character, a read-out gate having an input connected to the output of said switching means, said source of B-pulses being connected to said read-out gate to synchronously sample the output received from said switching means.

4. A nonsynchronous to synchronous converter receiving input nonsynchronous teletypewriter baud characters, comprising a storage device, including a gate, and a storage flip-flop; with an enabling input of said gate receiving said nonsynchronous bauds, a source of synchronous A-pulses connected to said gate to synchronously sample nonsynchronous bauds, with the output of said gate being connected to said storage flip-flop to correspondingly trigger it synchronously to the binary state of the received nonsynchronous input; a double-throw switching means having one input connected to the output of said storage flip-flop, and having its other input receiving said input nonsynchronous bauds; a read-out circuit having a read-out gate, and a read-out flip-flop, with said read-out gate having an enabling input connected to the output of said switching means, a source of synchronous B-pulses time interleaved with said A-pulses, means connecting said B-pulse source to said read-out gate, with the output of said read-out gate triggering corresponding output states of said read-out flip-flop; a decision device including, a quarter-baud delay means having its input receiving said input nonsynchronous bauds; first and second control gates with the first control gate being connected to said source of A-pulses and the second control gate being connected to said source of B-pulses, means for enabling both of said control gates in response to a character-start output from said quarter-baud delay means, a decision flip-flop having an input connected to the output of the second control gate, disabling means connected between the output of said first control gate and an input of said second control gate, with said disabling means being actuated by any A-pulse passing through said first control gate to disable said second control gate, said second control gate while enabled being capable of passing a B-pulse to trigger said decision flip-flop, said switching means being connected to the output of said decision flip-flop and being actuated according to the output state of said decision flip-flop, and said disabling means providing a reset pulse to said decision flip-flop near the end of each quarter-baud delayed character.

5. Converter means as defined in claim 4 in which said disabling means comprises a counter system having a plurality of counters with the output of one of the counters being connected to the enabling input of said first control gate, an "and" circuit having a plurality of inputs coupled to outputs of at least some of said counters, the output of said quarter-baud delay means being connected to the input of one of said counters, and an enabling input of said second control gate being connected to the output of said "and" circuit.

6. Means for converting a nonsynchronous baud-character input into synchronous output data, comprising a source of A-pulses, and a source of B-pulses, with said pulses being synchronous and said B-pulses having a 90 degree phase relationship with said A-pulses, a storage gate receiving the nonsynchronous input characters at an enabling input and having another input receiving said A-pulses to synchronously sample said nonsynchronous bauds, a storage flip-flop receiving the output of said storage gate and being synchronously triggered to corresponding output states, double-throw switching means having one input connected to the output of said storage flip-flop and having another input receiving said nonsynchronous characters, a read-out gate having an enabling input connected to the output of said switching means and another input connected to said B-pulse source to synchronously sample data received from said switching means, a read-out flip-flop receiving the output of said read-out gate and having its output correspondingly triggered to provide synchronous output data; a decision device including, quarter-baud delay means receiving said non-synchronous input, a counter system having at least first-second, third and fourth tandem-connected binary counters, with an input to the fourth counter connected to the output of said delay means, a first control gate having an enabling input connected to the output of the fourth counter and having another input receiving said A-pulses and having an output connected to an input of the first counter, an "and" circuit having inputs connected to outputs of first, second and third counters, said "and" circuit being enabled by said counter system upon the start of a quarter-baud delayed character from said delay means, a second control gate having an enabling input connected to the output of said "and" circuit and having another input receiving said B-pulse source, a decision flip-flop having an input connected to the output of said second control gate, means connecting the output of said decision flip-flop to said switching means, with the state of said switching means being controlled by opposite state of flip-flop.

7. A nonsynchronous to synchronous converter as defined in claim 6 in which the input to said decision flip-flop is connected to the output of said third counter to trigger said decision flip-flop at the end of a code character to a normal output state, said normal output state causing said switching means to pass to its input from said storage device.

8. A nonsynchronous to synchronous converter means as defined in claim 7 having means connecting the output of said decision flip-flop directly to the input to said read-out flip-flop, with actuation of said flip-flop from a normal output state triggering said read-out flip-flop.

9. A nonsynchronous to synchronous code converter as defined in claim 7 in which said switching means comprises first and second switching gates, with each having enabling inputs respectively connected to the output of said storage flip-flop and to the nonsynchronous input of said converter, said decision flip-flop providing a pair of opposite outputs respectively connected to other inputs of said first and second switching gates, with the normal output state of said decision flip-flop maintaining said first gate enabled to pass the output of said storage flip-flop, an "or" gate having a pair of inputs respectively connected to the outputs of said first and second switching gates, and the output of said "or" circuit connected to an input of said read-out gate.

10. Means for converting input nonsynchronous character-coded bauds to synchronous bauds, with each character introduced by a "start" pulse, comprising sources of A-pulses and B-pulses which are synchronous and time-interleaved, a delay device receiving the nonsynchronous "start" pulses and providing an output pulse one-quarter baud period after the beginning of each "start" pulse, a counter system having a plurality of binary counters connected in tandem and being able to count up to at least the number of bauds in each of said code characters, with the last of said counters having an input connected to the output of said delay device, a first control gate having inputs connected to the A-pulse source and to the output of the last counter, said first control gate having its output connected to the input of the first counter, said first control gate being enabled by the last counter upon its reception of an output pulse from said delay device, an "and" circuit having a plurality of inputs connected to outputs of several of said counters, said "and" circuit being enabled upon reception of a delayed "start" pulse from said delay device by said fourth counter, said "and" circuit having its output disabled by said first A-pulse passing through said first control gate, a second control gate having an enabling input connected to the output of said "and" circuit and having another input connected to said B-pulse source, a decision flip-flop having a first input connected to the output of said second control gate and having a second input connected to an output of the next-to-last counter for resetting said decision flip-flop to a normal output state, a storage-gating means having an input receiving said nonsynchronous bauds and having another input receiving said A-pulses to sample said bauds at the rate of said A-pulses, a storage flip-flop being triggered by the output of said storage gating means, first and second switching gate means, with the input of said first switching gate means being connected to the output of said storage flip-flop, and with the output of said second switching gate means receiving said nonsynchronous input bauds, an "or" circuit having inputs connected respectively to the outputs of said first and second switching gate means, said first and second switching gate means having triggering inputs respectively connected to opposite outputs of said decision flip-flop, read-out gate means having an input connected to the output of said "or" circuit, means connecting another input of said read-out gate to said B-pulse source, and a read-out flip-flop connected to the output of said read-out gate and having its output actuated correspondingly and synchronously.

11. A nonsynchronous to synchronous converter as defined in claim 10 in which said delay device comprises a one-shot multivibrator providing a pulse with a period equal to about one-quarter baud, first differentiating means receiving said nonsynchronous input bauds and connected to the input of said multivibrator, an "and" gate having an input also receiving said nonsynchronous input bauds, a second differentiating means connected between the output of said multivibrator and another input to said "and" gate, and the output of said "and" gate connected to the input of the last counter.

12. A nonsynchronous to synchronous converter as defined in claim 10 in which said counter system has four binary counters, whereby said counter system accommodates teletypewriter characters, each having five information baud periods in addition to stop and start pulses.

13. A nonsynchronous to synchronous converter means as defined in claim 10 including triggering means coupled between an output of said decision flip-flop and the input to said read-out flip-flop to automatically trigger its output to a level corresponding to a synchronous output "start" pulse after an input "start" pulse is received.

14. A system as defined in claim 13 in which each flip-flop is actuatable to opposite states by pulses having the same polarity but provided at opposite inputs, a first inverter receiving said nonsynchronous input and providing opposite-phased outputs, said storage-gating means comprising a pair of gates respectively connected between the opposite outputs of said inverter and the opposite inputs of said storage flip-flop, a second inverter connected to the outputs of said first and second switching means, said read-out gate means comprising a pair of read-out gates, with said read-out gates being connected respectively between opposite-phased outputs from switching gate means and the opposite inputs of said read-out flip-flop.

15. A means for converting a nonsynchronous teletypewriter signal to a synchronous signal, with each teletypewriter character having a "start" pulse, five information bauds and a "stop" baud, comprising a pulse-shaper receiving said nonsynchronous signal and providing inverted and uninverted outputs, a delay multivibrator providing a one-quarter baud delay having its input connected to one output of said pulse-shaper, a counter system having four binary counters connected in tandem, with the input to the fourth counter being connected to the output of said delay multivibrator, a synchronous timing source providing inverted square-waves A and B, a first control gate having an output connected to an input of said first counter, differentiating means connected between the output of said fourth counter and the input of said first counter, A-wave differentiating means generating positive A-pulses, and B-wave differentiating means providing positive B-pulses, said A-pulses provided to one input of said first control means, another input of said first control gate connected to the output of the fourth counter, an "and" circuit having inputs respectively connected to the outputs of the first, second, and third counters and being enabled by the reception of a first pulse from said delay multivibrator per-code-character, a decision flip-flop having a pair of inputs and a pair of inverted outputs, a second control gate having an input connected to the output of said "and" circuit and an output connected to an input of said decision flip-flop, the differentiating means for said B-wave connected to the other input of said second control gate, another differentiating circuit connecting another output of said third counter to an opposite input of said decision flip-flop; a storage flip-flop having a pair of inputs and an output, a pair of storage gates having their outputs respectively connected to the inputs of said storage flip-flop, respective inputs of said storage gates connected to the opposite inverter outputs of said pulse-shaper, said storage gates receiving the differentiated A-wave, first and second switching gates, with the first switching gate having an input connected to the output of said storage flip-flop, said second decision gate having an enabling input connected to an output of correspondingly-opposite polarity of said pulse-shaper, the first and second switching gates having other inputs respectively connected to the opposite output of said decision flip-flop, an "or" circuit having its inputs connected to the outputs of said switching gates, first and second read-out gates, with said first read-out gate having an input connected to the output of said "or" circuit, a polarity inverter connected between the output of said "or" circuit and an input of said second read-out gate, other respective inputs of said first and second read-out gates receiving the differentiated B-wave, a read-out flip-flop having a pair of opposite inputs respectively connected to the outputs of said read-out gates, a "start" gate having its output connected to one input of said read-out flip-flop and having one input connected to the output of said "and" circuit, and a third differentiating circuit connected between an output of said decision flip-flop and another input to said "start" gate, with said read-out flip-flop providing the synchronous output of said system.

16. A system for converting nonsynchronous binary-coded input characters into a baud-synchronous output, wherein a plurality of binary bauds are included in each character, comprising means for splitting said input characters into at least two channels, means for delaying one channel behind the other channel by approximately one-half baud, means providing at least first and second sets of synchronous timing pulses, said sets being time interleaved, means for sensing the start of each input character and providing a sense pulse delayed by approximately one-quarter baud behind each start, means for determining which of said sets provides a first pulse after sense pulse and providing a first or second output according to which set occurred first, switching means for selecting one of said channels as its output corresponding to a respective output of said determining means, sampling means connected to the output of said switching means for sampling its output in synchronism with the timing of said sets.

17. A system for converting input nonsynchronous binary data characters to baud-synchronous data characters comprising, means for splitting said input characters into at least first and second paths, a first source providing a first set of synchronous-timing pulses, and a second source providing a second set of synchronous-timing pulses, with the pulses of the first set occurring during the mid-periods of the pulses of said second set, first sampling means for sampling the data of said first path with said first set, means for regenerating data sampled by said first sampling means, means for providing a decision input signal delayed behind a beginning of each character by about a quarter baud, decision means receiving said decision input signal and determining which of said sets has a pulse occurring first after each decision input signal, switching means connected to the ouput of said regenerating means and to an output of said first path to pass one of these outputs in response to a determination of said decision means and second sampling means for sampling the passed output of said switching means with said second set.

18. A system for converting nonsynchronous input binary-coded data characters to baud-synchronous characters, comprising a source providing sets A and B of synchronous pulses, with the pulses of set A delayed one-half a baud behind pulses of set B, a first path having an output of nonsynchronous input data, a second path receiving said input data and regenerating it in synchronism with set A, means for generating a pulse delayed one-quarter baud behind a beginning of each input character, a decision means for determining which of said sets provides a first pulse after said generated pulse, first or second outputs from said decision means respectively provided for the first occurrence of set A or B, switching means receiving the outputs of said first and second paths and receiving the first and second outputs of said decision means, said switching means passing said first path in response to the first output of said decision means, said switching means passing said second path in response to the second output of said decision means, and output sampling means connected to the output of said switching means and sampling it with said set B.

19. A means of converting nonsynchronous teletypewriter coded input characters to baud-synchronous output characters, comprising a source of A-pulses, and a source of B pulses, with said pulses being synchronous and being time-interleaved with respect to each other, means for synchronously sampling the nonsynchronous input characters with said A-pulses, a first bistable-storage device connected to said sampling means for storing bits of said sampled characters, means for generating decision input pulses delayed behind a beginning of each of said nonsynchronous input characters by approximately one-quarter baud period; decision means, including decision gate means being enabled in response to each decision input pulse and having an input connected to said source of B pulses, a decision bistable circuit being reset in response to said A-pulses, said decision gate means having an output connected to a set input of said decision bistable circuit, means for disabling said decision gate means with the first A pulse occurring after its enablement, first and second switching gate means being connected to said decision bistable circuit which enables said first gate when set and enables said second gate when reset, output sampling gate means connected to combined outputs of said first and second switching gate means, said output sampling gate means sampling synchronously with said B pulses, and readout bistable means being triggered by said output sampling means to shape said synchronous output signal.

References Cited in the file of this patent

UNITED STATES PATENTS

| | | |
|---|---|---|
| 2,552,968 | Hochwald | May 15, 1951 |
| 2,596,147 | Hampton | May 13, 1952 |
| 2,843,669 | Six et al. | July 15, 1958 |